United States Patent
Fink et al.

(10) Patent No.: US 10,349,571 B2
(45) Date of Patent: Jul. 16, 2019

(54) CONSTANT PRESSURE HYDRAULIC CIRCUIT WITH RELIEF PROTECTION INDEPENDENT OF PRESSURE CIRCUIT

(71) Applicant: KUHN KRAUSE, INC., Hutchinson, KS (US)

(72) Inventors: Jerome Thomas Fink, Hutchinson, KS (US); Rodney Lee Hagman, Buhler, KS (US)

(73) Assignee: KUHN KRAUSE, INC., Hutchinson, KS (US)

( * ) Notice: Subject to any disclaimer, the term of this patent is extended or adjusted under 35 U.S.C. 154(b) by 933 days.

(21) Appl. No.: 14/701,214

(22) Filed: Apr. 30, 2015

(65) Prior Publication Data
US 2016/0316611 A1 Nov. 3, 2016

(51) Int. Cl.
A01B 63/32 (2006.01)
F15B 11/10 (2006.01)
F15B 13/02 (2006.01)

(52) U.S. Cl.
CPC ........... *A01B 63/32* (2013.01); *F15B 11/10* (2013.01); *F15B 13/024* (2013.01); *F15B 13/025* (2013.01); *F15B 2211/3054* (2013.01); *F15B 2211/50554* (2013.01); *F15B 2211/55* (2013.01); *F15B 2211/6336* (2013.01)

(58) Field of Classification Search
CPC ............ F15B 2211/45; F15B 2211/46; F15B 2211/30575; F15B 11/046; F15B 11/006; F15B 13/024; F15B 13/025
USPC .......................................... 91/451, 452, 450
See application file for complete search history.

(56) References Cited

U.S. PATENT DOCUMENTS

| 3,481,407 | A |   | 12/1969 | Arnold et al. |         |
|-----------|---|---|---------|---------------|---------|
| 3,770,322 | A | * | 11/1973 | Cobb          | E02F 5/326 |
|           |   |   |         |               | 172/40  |
| 4,066,004 | A | * | 1/1978  | Alcalay       | E02F 3/422 |
|           |   |   |         |               | 91/176  |

(Continued)

FOREIGN PATENT DOCUMENTS

EP          0386591 A2     9/1990

OTHER PUBLICATIONS

NPL—Shoemaker Incorporated unit 8136.*

*Primary Examiner* — Michael Leslie
*Assistant Examiner* — Michael Quandt
(74) *Attorney, Agent, or Firm* — Oblon, McClelland, Maier & Neustadt, L.L.P.

(57) ABSTRACT

A hydraulic circuit for an agricultural implement consisting of a hydraulic cylinder that exerts a force on a component of the implement. A pressure reduction valve located between a hydraulic power source and the hydraulic cylinder maintains pressure to no more than a preset maximum to protect the hydraulic cylinder by routing excess hydraulic fluid back through a hydraulic line into a reservoir. A pressure relief valve with a preset maximum pressure greater than that of the pressure reduction valve is located between the pressure reduction valve and the hydraulic cylinder, and is connected to the reservoir through a dedicated return line. If hydraulic fluid pressure in the circuit increases to greater than the maximum of the pressure reduction valve, hydraulic fluid is diverted back to the reservoir through the pressure relief valve and a dedicated return line.

1 Claim, 10 Drawing Sheets

(56) References Cited

U.S. PATENT DOCUMENTS

| | | | | |
|---|---|---|---|---|
| 4,915,014 A | * | 4/1990 | Gilmore | A01B 63/14 172/311 |
| 5,065,681 A | | 11/1991 | Hadley | |
| 6,035,943 A | * | 3/2000 | Gerein | A01B 63/22 172/328 |
| 6,378,619 B2 | | 4/2002 | Mayerle et al. | |
| 7,017,675 B2 | * | 3/2006 | Ankenman | A01B 49/02 172/142 |
| 7,513,521 B2 | * | 4/2009 | Posselius | A01B 61/02 280/463 |
| 7,740,252 B2 | | 6/2010 | Strong | |
| 7,823,379 B2 | * | 11/2010 | Hamkins | E02F 9/2217 60/414 |
| 8,020,485 B2 | * | 9/2011 | Jessen | F15B 11/028 91/435 |
| 8,176,992 B2 | * | 5/2012 | Yuen | A01B 73/048 172/311 |
| 8,833,481 B2 | * | 9/2014 | Blunier | A01B 73/044 172/311 |
| 2014/0251646 A1 | | 9/2014 | Gray et al. | |

\* cited by examiner

CONSTANT PRESSURE HYDRAULIC CIRCUIT WITH RELIEF PROTECTION INDEPENDENT OF PRESSURE CIRCUIT

BACKGROUND

Field of the Disclosure

The present disclosure relates to agricultural and earthmoving implements, generally relating to implements for tilling, plowing and seeding, equipped with hydraulic control systems, and more specifically, to structure for providing constant pressure relief protection from excessive or sudden hydraulic pressure increases within a system designed to exert a constant downward force on the ground.

Description of the Related Art

This disclosure pertains to agricultural and earth moving implements operated hydraulically. A hydraulic system enables an implement to be raised and lowered. While in a lowered position, the hydraulic system maintains a constant downward pressure between an implement, such as agricultural components, and the ground surface, as described, for example, in U.S. Pat. No. 5,065,681.

However, due to many possible factors including, for example, slopes and topographical variations of the ground surface, and changes in vehicle position relative to the ground, the hydraulic pressure can vary significantly during operation. This necessitates the hydraulic system adapt the fluid pressure and displacement of a hydraulic cylinder so that the pressure between the agricultural components and the ground can be maintained as the agricultural implement traverses uneven terrain, or encounters obstacles of any kind.

Under certain conditions the hydraulic fluid pressure can rapidly increase due to operator error, an abrupt change in terrain or impact with an obstacle, such as a rock or tree stump. If hydraulic fluid stops flowing within the circuit for any reason, the hydraulic circuit is then effectively locked and, if hydraulic pressure increases rapidly, there is no means to quickly evacuate the hydraulic fluid inside the system to prevent buildup of additional pressure.

One scenario where this can occur, for example, is when the agricultural components are set on or close to the ground and the operator does not open the Selective Control Valve (SCV) and then proceeds to drive the agricultural implement over an obstacle. The impact of the agricultural components abruptly striking the ground or obstacle can cause pressure in the hydraulic cylinder to quickly increase. With the SCV closed, oil cannot escape. If the peak pressure reached inside the implement's hydraulic circuit is sufficiently high, damage to the mechanical structure or hydraulic system can occur. The increased operating speed of modern agricultural implements requires hydraulic systems to respond quickly to changes in hydraulic system pressure to prevent damage to system components.

SUMMARY

The disclosure pertains to a system and apparatus for relieving excess pressure in a hydraulic system that maintains constant downward pressure in an agricultural or earthmoving implement ("implement"), such as for tilling and seeding, particularly during rapid and unexpected pressure increases due to changes in ground surface and operating conditions. Such pressure increases can damage various structures and components of the implement, for example the hydraulic cylinder.

The implement is towed by a tractor equipped with a hydraulic pump and Selective Control Valve (SCV) that supplies hydraulic power to a hydraulic cylinder on the implement through a pressure reduction valve to maintain pressure below a predetermined pressure. If the pressure of the fluid in the implement's hydraulic system rises rapidly to another, higher predetermined pressure, a pressure relief valve installed between the pressure reduction valve and the hydraulic cylinder opens to allow some fluid to bypass the SCV and return to the tractor's reservoir by way of the power beyond return port.

Because the flow capacity of the power beyond return port is higher than that of the SCV, excess hydraulic fluid returns to the reservoir and relieves system pressure at a faster rate when equipped with the pressure relief valve. Furthermore, the hydraulic fluid pressure can be relieved regardless of whether the SCV is in an open or closed position, preventing damage that may occur when the SCV is in a closed position in a hydraulic system that is not equipped with a pressure relief valve.

Various embodiments of the pressure relief valve and related hydraulic fluid lines can be installed as an integral part of the implement at the time of manufacture or retrofit to an existing implement in the aftermarket.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
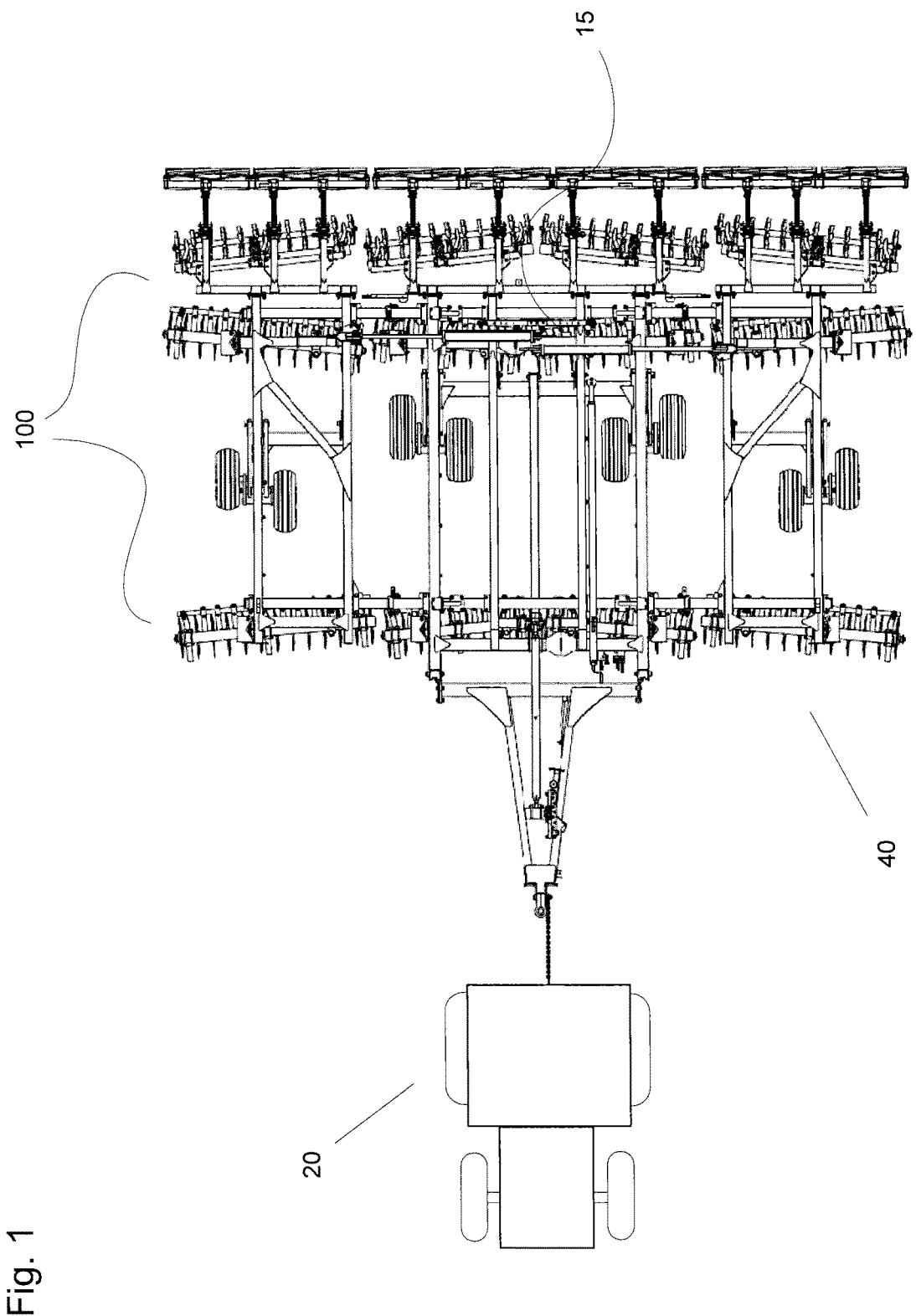
FIG. 1 is a plan view of an embodiment of a part of an agricultural implement with hydraulic cylinders attached to a tractor, according to certain aspects of the disclosure.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures.

The term "pressure reduction valve" refers to an apparatus that limits exit pressure to a predetermined maximum value while the term "pressure relief valve" refers to an apparatus that limits incoming pressure to a predetermined maximum value. The term "tractor" refers to a towing vehicle which contains a hydraulic pressure circuit that supplies pressurized hydraulic fluid to a towed vehicle, in this embodiment an agricultural implement.

The term "hydraulic cylinder", except where specified, refers to a hydraulic cylinder containing a double-acting piston, which can be actuated by hydraulic fluid on both sides of the piston, in order to provide force in both directions.

Referring now to the drawings, wherein like reference numerals designate identical or corresponding parts throughout the several views.

Figure 1A:
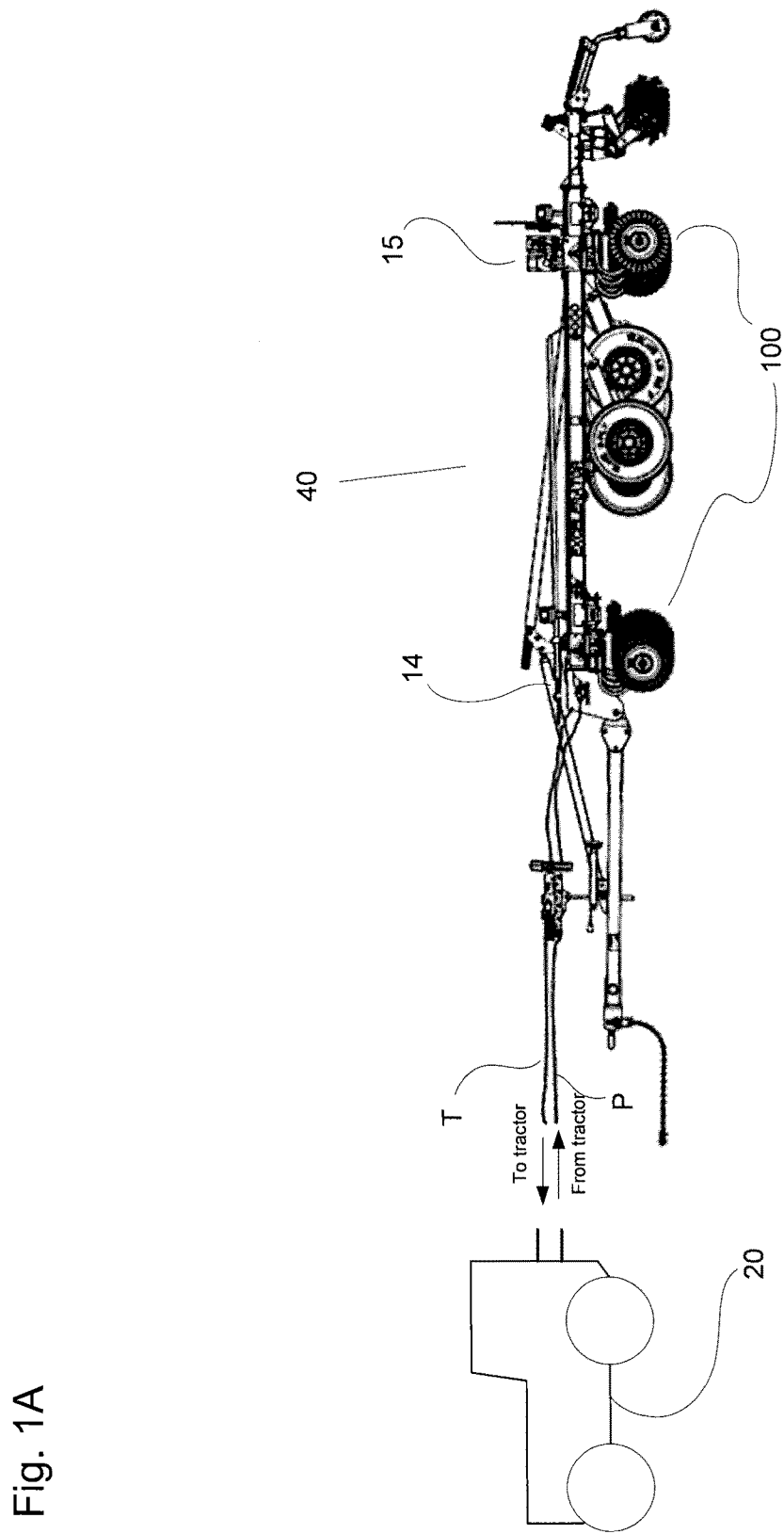
FIG. 1A is a side view of an embodiment of a part of an agricultural implement attached to a tractor equipped with a pressure relief apparatus, according to certain aspects of the disclosure.

FIG. 1 is a plan view and FIG. 1A is a side view of an embodiment of an agricultural implement 40 during extension of one or more hydraulic cylinders 15. The downward pressure applied to the agricultural wing 100 is provided by hydraulic cylinders 15. The agricultural wing 100 moves proportionally to the motion of the hydraulic cylinders 15 when the hydraulic circuit is operating within its normal pressure range and there is no open bypass. Hydraulic fluid from the tractor 20 is supplied to the hydraulic cylinder 15 by hydraulic line P. If at any time the hydraulic pressure leading to the hydraulic cylinder 15 exceeds the maximum pressure setting of the pressure relief valve 14, some hydraulic fluid is routed out of the agricultural implement 40 to the power beyond return port 52 through the hydraulic return line D on the agricultural implement 40.

Figure 2:
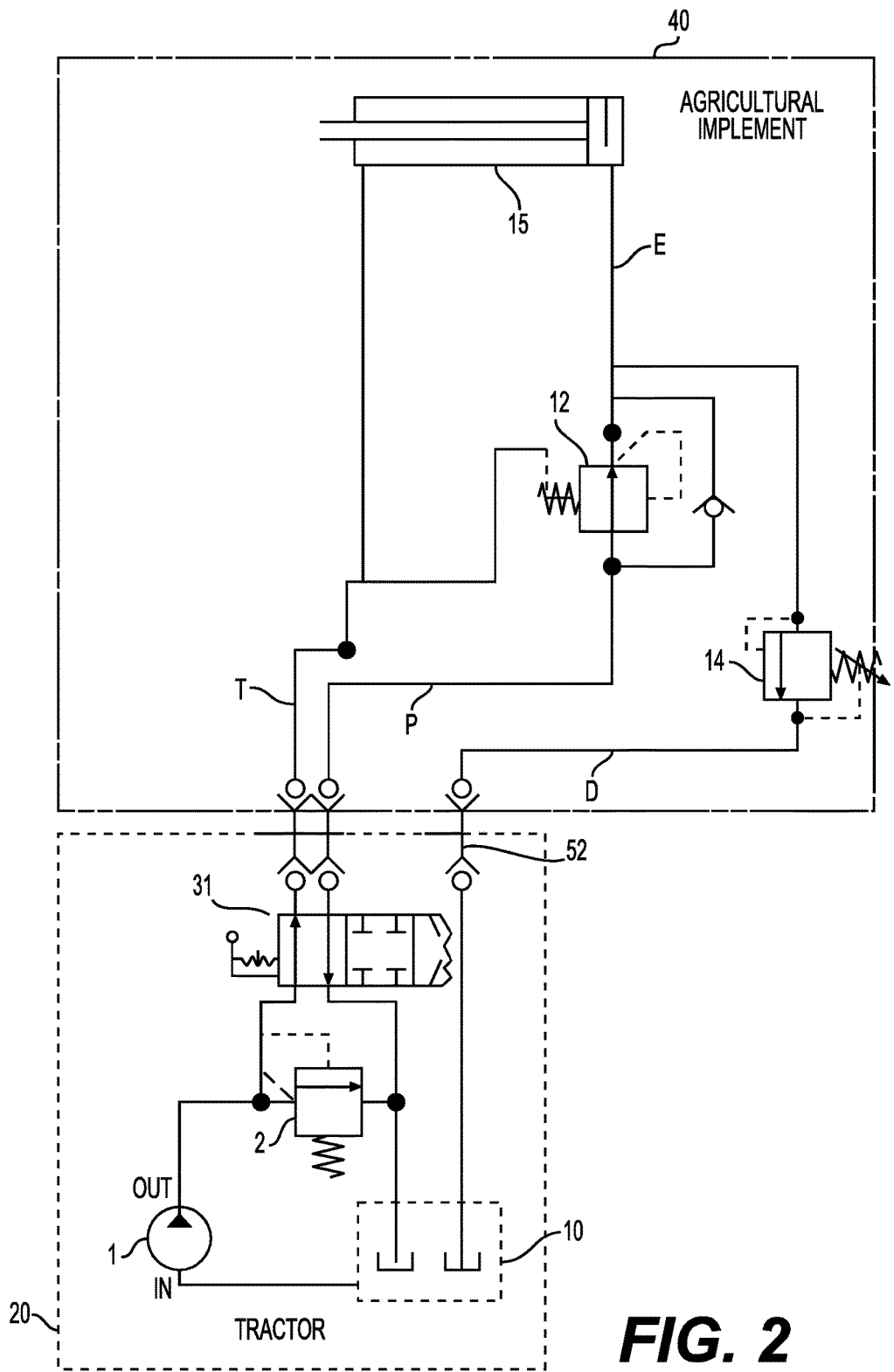
FIG. 2 is a schematic of an embodiment of a hydraulic circuit equipped with a pressure relief valve disposed between a pressure reduction valve and a hydraulic cylinder, external to a tractor's hydraulic circuit and internal to an agricultural implement's hydraulic circuit, according to certain aspects of the disclosure.

FIG. 2 describes an embodiment comprising a hydraulic circuit connecting a tractor 20 and agricultural implement 40, for the purpose of controlling the downward pressure upon the agricultural wing 100 (FIG. 1A) of the agricultural implement 40. In this embodiment, the portion of the hydraulic circuit on-board the tractor 20 comprises a pump 1, a pressure control valve 2, SCV 31 with two hydraulic lines T and P coupled to the agricultural implement 40, and a reservoir tank 10, The hydraulic fluid exits the pump 1 through the pressure control valve 2, which regulates the fluid pressure to less than a predetermined pressure in the range of 2,800 to 3,000 psi. Thus the maximum pressure of any hydraulic fluid exiting tractor 20 is greater than that of the maximum pressure at which either the pressure reduction valve 12 or the pressure relief valve 14 on the agricultural implement 40 operates (described below in further detail). This enables the tractor 20 to supply sufficient hydraulic pressure to operate the hydraulic cylinder 15 on the agricultural implement 40.

The portion of the circuit on-board the agricultural implement 40 comprises a pressure reduction valve 12, a pressure relief valve 14, a hydraulic cylinder 15, two hydraulic lines T and P that couple to the tractor's 20 respective hydraulic lines T and P, and a hydraulic line E that connects the exit of the pressure reduction valve 12 and the hydraulic cylinder 15. Hydraulic line P leads from the SCV 31 to the pressure reduction valve 12. Hydraulic line T leads from the SCV 31 to the hydraulic cylinder 15.

In addition, the agricultural implement 40 is fitted with an additional hydraulic fluid line D that leads from between the pressure reduction valve 12 and the hydraulic cylinder 15 to a pressure relief valve 14, which is connected to the reservoir tank 10 on the tractor 20 by way of hydraulic line D and the power beyond return port 52.

The SCV 31 has three possible positions, two open and one closed. When pump 1 is operating, if the SCV 31 is closed, the pump 1 recirculates hydraulic fluid from the reservoir tank 10 on the tractor 20 through the pressure control valve 2 and back into the same reservoir tank 10. The fluid does not circulate beyond the tractor 20, such that the hydraulic cylinder is fixed.

If the SCV 31 is open, pump 1 circulates hydraulic fluid from the reservoir tank 10 on the tractor 20 through either hydraulic line T or P into the agricultural implement 40. The two positions where the SCV 31 is open enable the hydraulic circuit to either extend or retract the hydraulic cylinder 15.

When extending the hydraulic cylinder 15, fluid travels from the tractor 20 side through hydraulic line P to the pressure reduction valve 12 on its way to the hydraulic cylinder 15, then back to the tractor 20 through hydraulic line T.

When retracting the hydraulic cylinder 15, fluid travels from the SCV 31, through the port to hydraulic line T, and to the hydraulic cylinder 15, then back to the tractor through hydraulic line P. Pressure reduction in this mode is not critical. In the event the hydraulic pressure spikes within the hydraulic cylinder 15, it will compress and force hydraulic fluid back through the pressure reduction valve 12 or the pressure relief valve 14. There is low risk of mechanical or hydraulic equipment damage.

The pressure reduction valve 12 ensures hydraulic fluid pressure reaches hydraulic cylinder 15 through hydraulic line E at no more than a predetermined maximum pressure. In some embodiments, the predetermined maximum pressure of the pressure control valve 12 is in the range of 600 to 1,400 psi. In other embodiments, the predetermined maximum pressure is in the range of 700 to 1,300 psi or 800 psi to 1,200 psi. In a preferred embodiment, the predetermined maximum pressure of the pressure control valve 12 is 800 psi.

However, if the hydraulic pressure in hydraulic line E should for some reason exceed the predetermined maximum pressure setting of the pressure relief valve 14, a portion of the fluid in hydraulic line E is routed through the pressure relief valve 14, out the return line D, and back to the hydraulic reservoir tank 10 by way of the power beyond return port 52 on the tractor 20.

In some embodiments, the predetermined maximum pressure of the pressure relief valve 14 is in the range of 600 to 1,400 psi. In other embodiments, the predetermined maximum pressure is in the range of 700 to 1,300 psi or 800 psi to 1,200 psi. In a preferred embodiment, the predetermined maximum pressure of the pressure relief valve 14 is 950 psi.

The predetermined maximum pressure of the pressure reduction valve 12 is always less than the predetermined maximum pressure of the pressure relief valve 14, ensuring the operating pressure in hydraulic line E remains within a particular range, even if the agricultural implement 40 is subject to forces that would otherwise sharply increase pressure out of said range in a hydraulic circuit of this type that is not equipped with a pressure relief system.

If the SCV 31 is open when pressure increases rapidly within the hydraulic circuit, then some portion of the hydraulic fluid could also flow back to the reservoir tank 10 in the tractor 20 through the hydraulic lines T or P, depending on which way the SCV 31 is set and the hydraulic fluid is circulating. However, as stated in the description of the related art, if the SCV 31 is in the closed position and the implement 40 is not equipped with an embodiment of the system of this disclosure, the hydraulic system of the agricultural wing 100 are locked. Hydraulic fluid would have no way to flow back to the reservoir tank 10 and relieve the system of its rapidly rising pressure.

However, an agricultural implement 40 equipped with an embodiment described by this disclosure contains a way to relieve the excess hydraulic pressure, even when the SCV 31 is closed, by enabling hydraulic fluid to escape through the power beyond return port 52, if hydraulic pressure within the agricultural implement 40 increased to more than the predetermined maximum pressure setting of the pressure relief valve 14.

The flow rate of a power beyond return port 52 is generally much greater than that of either port on the SCV 31 leading to hydraulic lines T and P. Thus, using the power beyond return port 52 as a path for hydraulic fluid pressure relief, by way of pressure relief valve 14 and hydraulic return line D to the power beyond return port 52 of the tractor 20, reduces risk of sudden pressure build up by providing an additional flow path for excess hydraulic fluid.

Figure 2A:
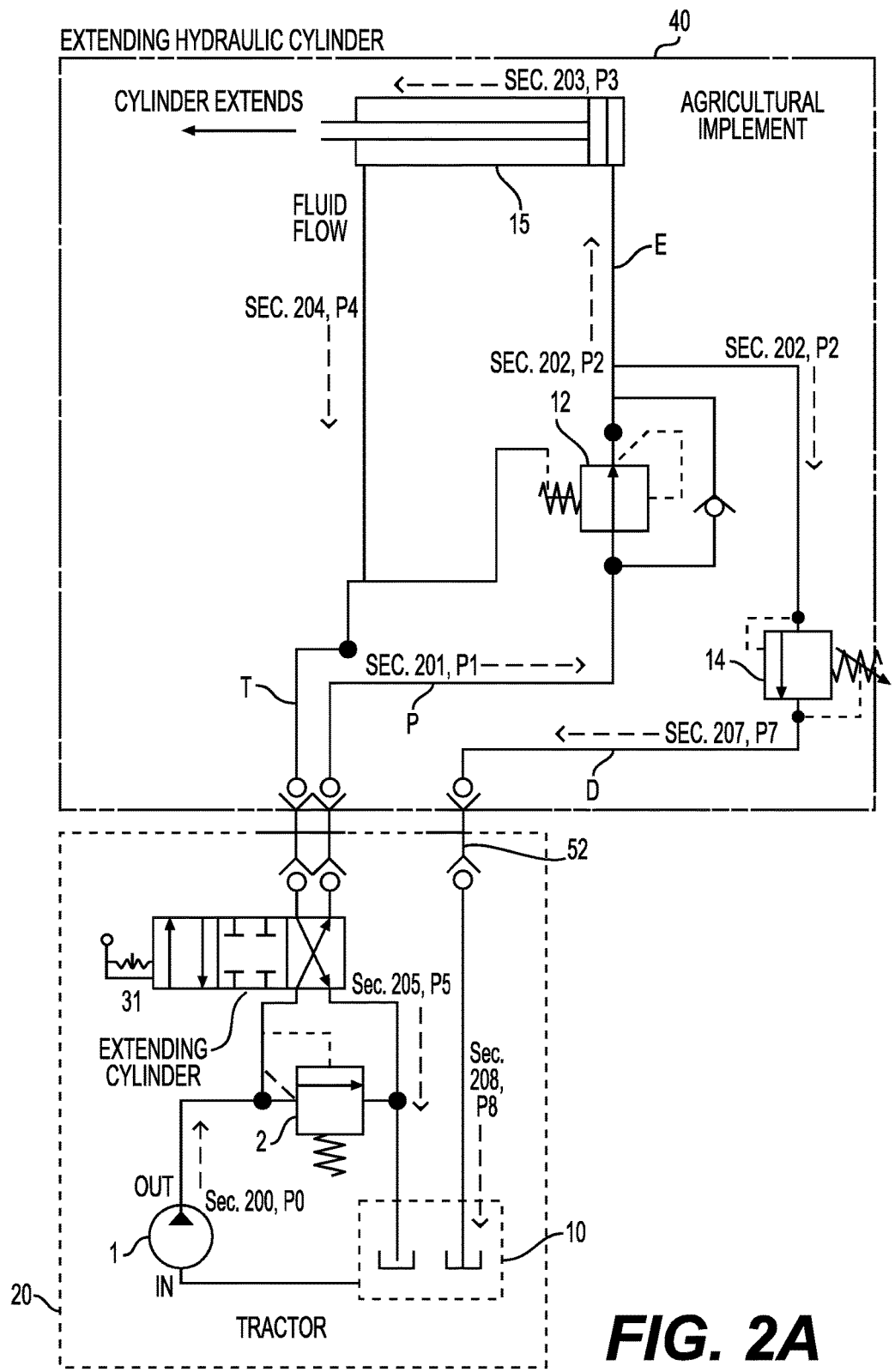
FIG. 2A illustrates the flow path of hydraulic fluid in the schematic of FIG. 2 for the operating condition where the SCV is open to extend the hydraulic cylinder.

FIG. 2A illustrates the flow path of the hydraulic fluid through the hydraulic circuit of the tractor 20 and the agricultural implement 40 when extending the hydraulic cylinder 15. The hydraulic fluid travels from the pump 1 at section 200 at a pressure P0 through the SCV 31, out the tractor 20, and into the agricultural implement 40 via hydraulic line P. The fluid in hydraulic line P in section 201 is at a pressure P1 until it enters the pressure reduction valve 12. From the pressure reduction valve 12, the fluid travels at pressure P2 through section 202 of hydraulic line E to the hydraulic cylinder 15. The fluid in section 203 at a pressure P3, forces the hydraulic cylinder 15 to extend, forcing the agricultural wing 100 (FIG. 1A) to move toward and apply pressure on the ground surface below. Beyond the hydraulic cylinder 15, the fluid flows into section 204 of hydraulic fluid line T at a pressure P4, out of the agricultural implement 40, back to the SCV 31 port, and back to the hydraulic fluid reservoir tank 10 through section 205 at a pressure P5. Furthermore, section 202 of the hydraulic line E, located between the pressure reduction valve 12 and the hydraulic cylinder 15, operates at a pressure P2, and also branches off to the pressure relief valve 14, also at a pressure P2 leading to the pressure relief valve 14.

If the hydraulic cylinder 15 is being forced to retract and pressure P2 of section 202 of the hydraulic line E is less than the maximum pressure allowed by the pressure relief valve 14, then no hydraulic fluid passes through pressure relief valve 14 and, thus, there is no flow or pressure in the hydraulic line D leading from the pressure relief valve 14, out of the agricultural implement 40, and back through the power beyond return port 52 and reservoir tank 10. Thus, pressures P7 in section 207 is zero.

If the hydraulic cylinder 15 is being forced to retract and pressure P2 of section 202 of the hydraulic line E is more than the maximum pressure allowed by the pressure relief valve 14, then hydraulic fluid from hydraulic line E is passed through pressure relief valve 14 to relieve system pressure. Thus, some amount of hydraulic fluid at a pressure P7 flows through section 207 of the hydraulic line D leading from the pressure relief valve 14, out of the agricultural implement 40, and back through the power beyond return port 52 and reservoir tank 10. Hydraulic fluid will continue to flow through the pressure relief valve 14 until pressure P2 in section 202 of the hydraulic line E is less than the maximum pressure allowed by pressure relief valve 14, at which time the pressure relief valve 14 will close and stop the flow of hydraulic fluid through hydraulic line D to the power beyond port 52 and reservoir tank 10.

Figure 2B:
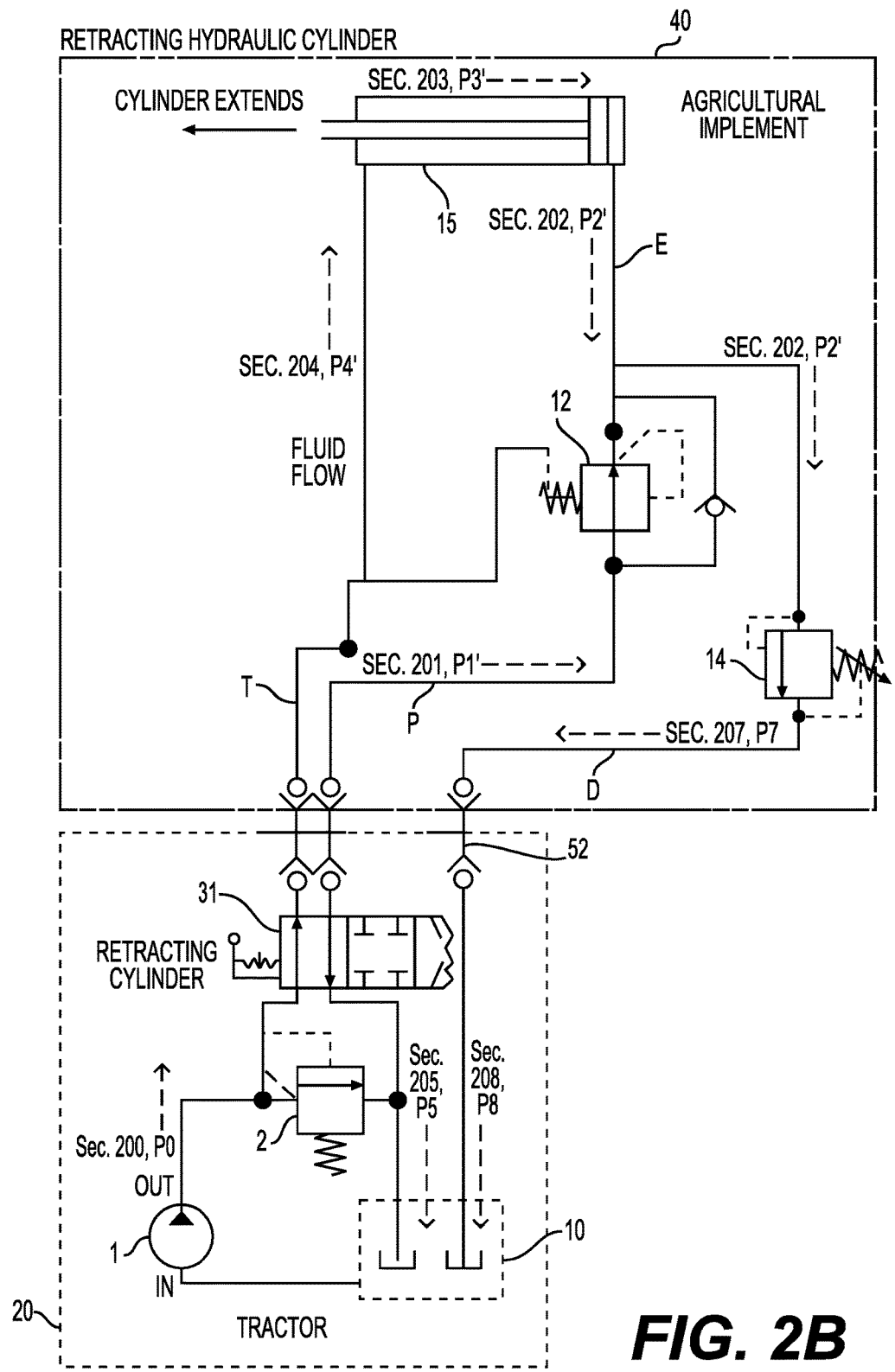
FIG. 2B illustrates the flow path of hydraulic fluid in the schematic of FIG. 2 for the operating condition where the SCV is open to retract the hydraulic cylinder.

FIG. 2B illustrates the flow path of the hydraulic fluid through the hydraulic circuit of the tractor 20 and the agricultural implement 40 when retracting the hydraulic cylinder 15. The hydraulic fluid travels from the pump 1 via section 200 at a pressure P0 flows through the SCV 31, out the tractor 20, and into the agricultural implement 40 via hydraulic line T. The fluid in section 204 of hydraulic line T is at a pressure P4' until it enters the hydraulic cylinder 15. The fluid in section 203, at a pressure P3', forces the hydraulic cylinder 15 to compress, raising the agricultural wing 100 away from the ground surface below. From the hydraulic cylinder 15, the fluid travels through section 202 of hydraulic line E, at a pressure P2', to the bypass of the pressure reduction valve 12. From there the fluid flows out of the agricultural implement 40 through section 201 of hydraulic line P at a pressure P1', and into the tractor's 20 SCV 31 and reservoir tank 10. Between the SCV 31 and reservoir tank 10, the fluid flows through section 205 at a pressure P5. Furthermore, section 202 of the hydraulic line E, located on the agricultural implement 40 between the hydraulic cylinder 15 and the pressure reduction valve 12 also branches off to the pressure relief valve 14, also at a pressure P2' leading to the pressure relief valve 14.

If the hydraulic cylinder 15 is being retracted and pressure P2' in section 202 of the hydraulic line E is less than the maximum pressure allowed by the pressure relief valve 14, then no hydraulic fluid is passed through pressure relief valve 14 and thus there is no flow or pressure in the hydraulic line D leading from the pressure relief valve 14, out of the agricultural implement 40, and back through the power beyond return port 52 and reservoir tank 10. Thus, pressure P7 in section 207 is zero.

If the hydraulic cylinder 15 is being retracted and pressure P2' in section 202 of the hydraulic line E is more than the maximum pressure allowed by the pressure relief valve 14, then hydraulic fluid from hydraulic line E is passed through pressure relief valve 14 to relieve system pressure. Thus, some amount of hydraulic fluid at a pressure P7 flows through section 207 of hydraulic line D leading from the pressure relief valve 14, out of the agricultural implement 40, and back through the power beyond return port 52 and reservoir tank 10. Hydraulic fluid will continue to flow through the pressure relief valve 14 until pressure P2' in section 202 of hydraulic line E is less than the maximum pressure allowed by pressure relief valve 14, at which time the pressure relief valve 14 will close and stop the flow of hydraulic fluid through section 207 of hydraulic line D to the power beyond port 52 and reservoir tank 10.

Figure 2C:
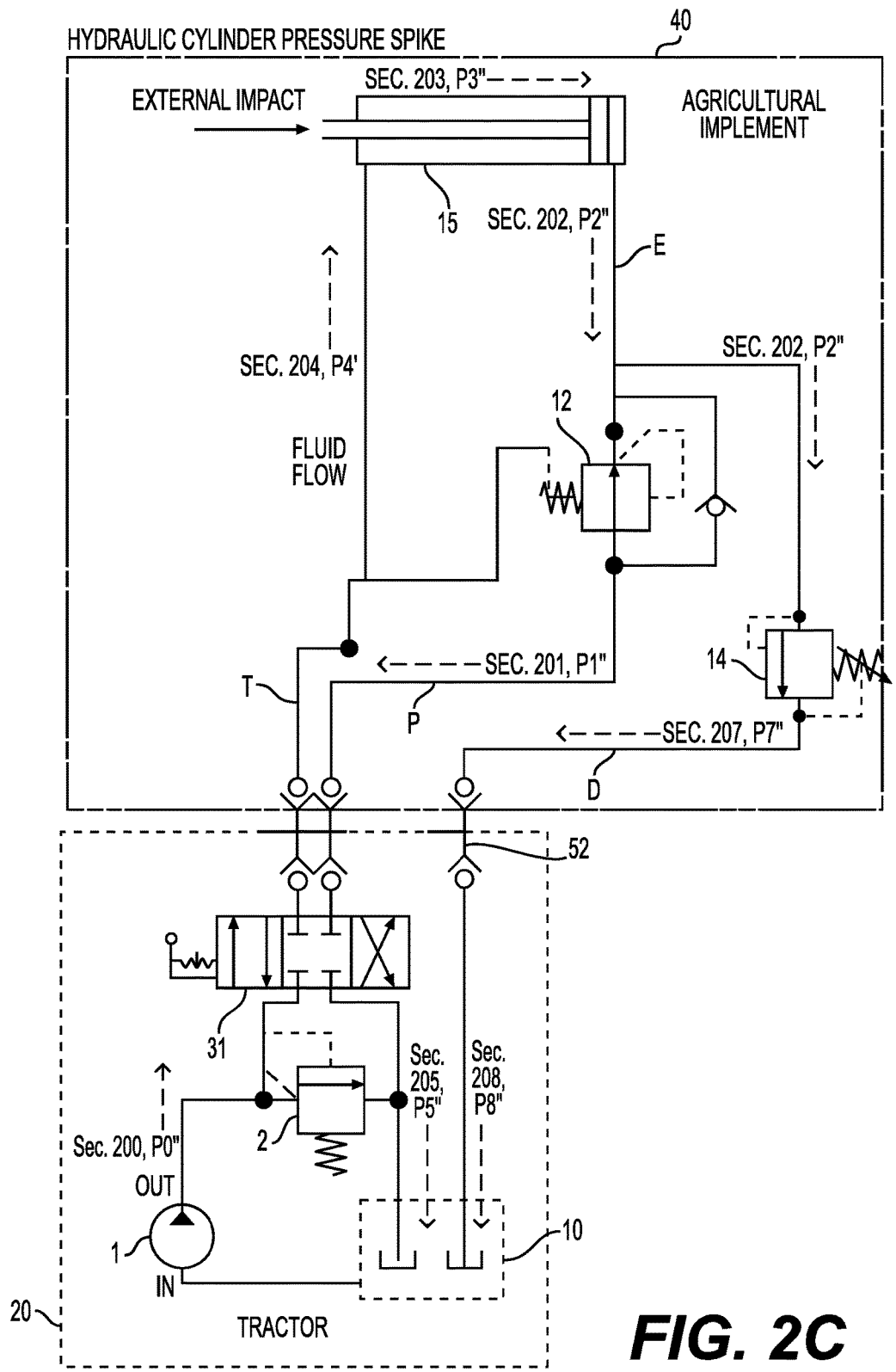
FIG. 2C illustrates the flow path of hydraulic fluid in the schematic of FIG. 2 for the operating condition where the SCV is closed and the hydraulic cylinder experiences a pressure spike.

FIG. 2C illustrates the flow path of the hydraulic fluid through the hydraulic circuit of the tractor 20 and the agricultural implement 40 when the SCV 31 is closed and the hydraulic cylinder 15 experiences a pressure spike due to an external impact of the agricultural wing 100 (FIG. 1A).

The agricultural implement 40 contains hydraulic fluid in lines T at section 204 at pressure P4", P at section 201 at pressure P1", D at section 207 at pressure P7", and E at section 202 at a pressure P2".

When hydraulic cylinder 15 experiences a sufficient external impact force, the pressure P2" within section 202 of line E increases, while pressure P4" within section 204 of line T and the hydraulic cylinder 15 internal pressure P3" in section 203 decreases.

The hydraulic fluid in line 202 and 201 will not be able to flow through line P because the SCV 31 is closed.

Since SCV 31 is closed, the only path for hydraulic fluid to flow is through the pressure relief valve 14 at section 202 at the end of line E. If the pressure P2" increases to the maximum pressure setting of pressure relief valve 14, hydraulic fluid will pass through the pressure relief valve 14, flow through section 207 of line D at pressure P7", through line section 208 at pressure P8", and back to the tractor 20 reservoir tank 10.

Figure 3A:
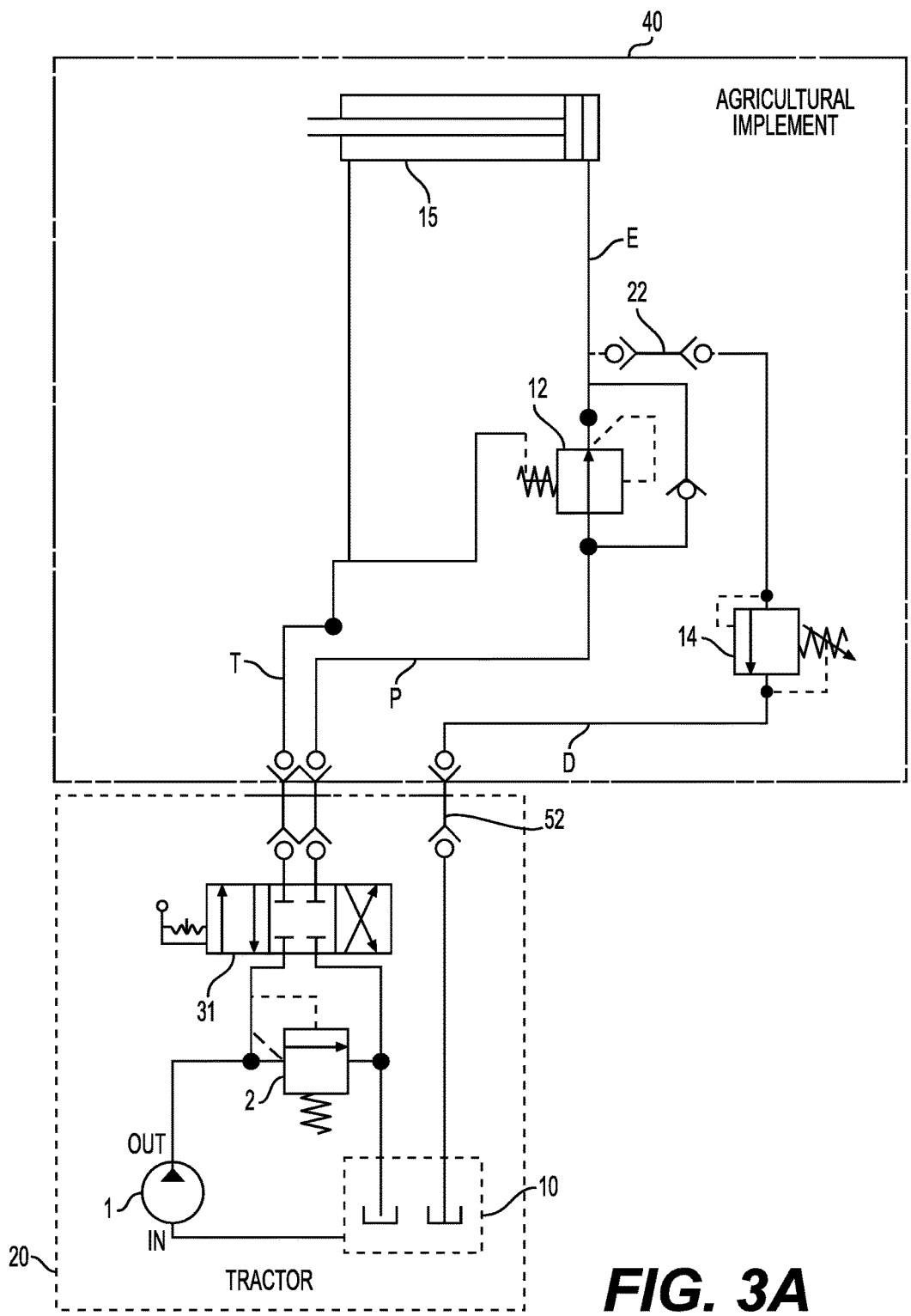
FIG. 3A is a schematic of an embodiment of a hydraulic circuit equipped with a pressure relief valve disposed between a pressure reduction valve and a hydraulic cylinder, external to a tractor's hydraulic circuit and external to an agricultural implement's hydraulic circuit, according to certain aspects of the disclosure.

FIG. 3A describes an embodiment similar to that of FIG. 2 and operates in a similar manner. However, the addition of port 22 allows a tractor 20 and, for example, an agricultural implement 40, not yet equipped with a pressure relief system, to be retrofit with a pressure relief system described by this disclosure. This embodiment, which could be provided as a complete kit in which the hydraulic return line D, comprising for example, a hose, pipe or tube, fitted with the pressure relief valve 14 somewhere along its length, is mounted externally to both the tractor 20, at power beyond return port 52, and the agricultural implement 40 at port 22.

Figure 3B:
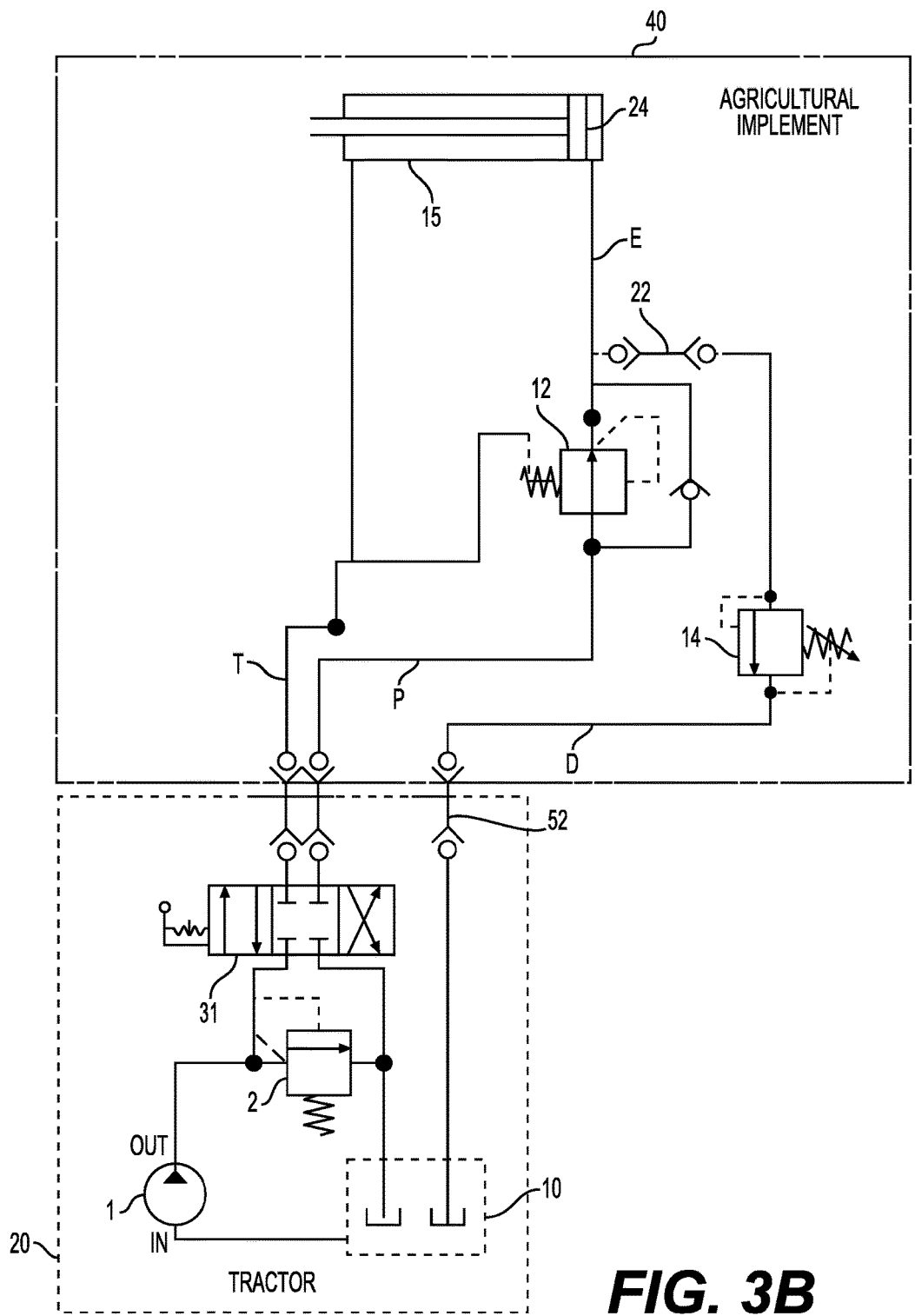
FIG. 3B is a schematic of an embodiment of a hydraulic circuit equipped with a pressure relief valve disposed between a pressure reduction valve and a hydraulic cylinder having a single-acting piston, according to certain aspects of the disclosure.

FIG. 3B describes an embodiment similar to that of FIG. 3A and operates in a similar manner where excess hydraulic system pressure is relieved through the pressure relief valve 14 through to a reservoir not located on the agricultural implement 40. However, the hydraulic cylinder 15 in this example has a single-acting piston 24 which can only extend under its own hydraulic power. An external force must be applied to the piston for it to retract.

Figure 3C:
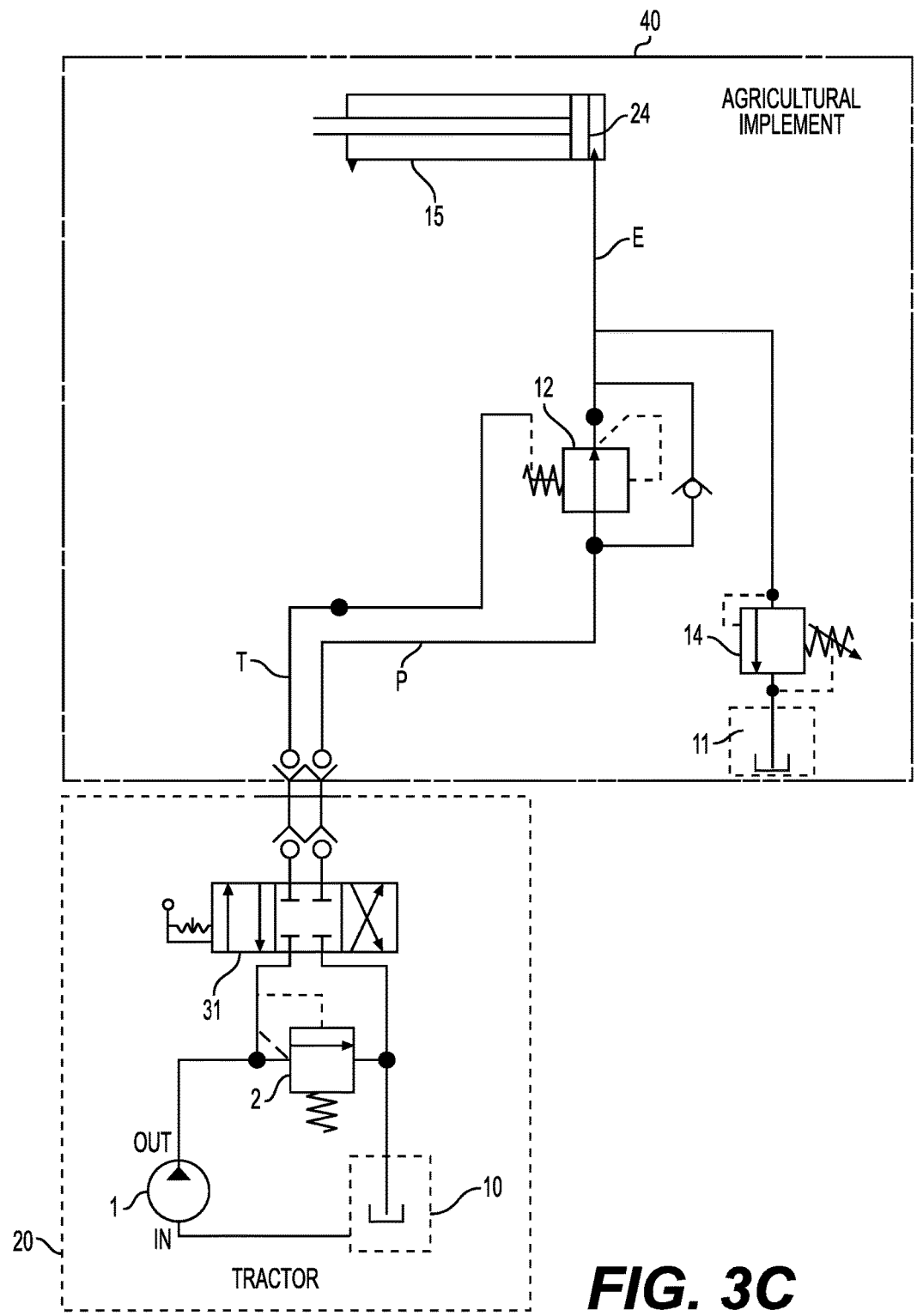
FIG. 3C is a schematic of an embodiment of a hydraulic circuit equipped with a pressure relief valve disposed between a pressure reduction valve and a hydraulic cylinder having a single-acting piston and a hydraulic reservoir on the implement, according to certain aspects of the disclosure.

FIG. 3C describes an embodiment similar to that of FIG. 3B and operates in a similar manner, including the single-acting piston 24 and the pressure relief valve 14. The agricultural implement 40 in this example has an implement reservoir 11, separate from any other container, into which hydraulic fluid flows when system pressure exceeds the predetermined limit of the pressure relief valve 14.

Figure 4:
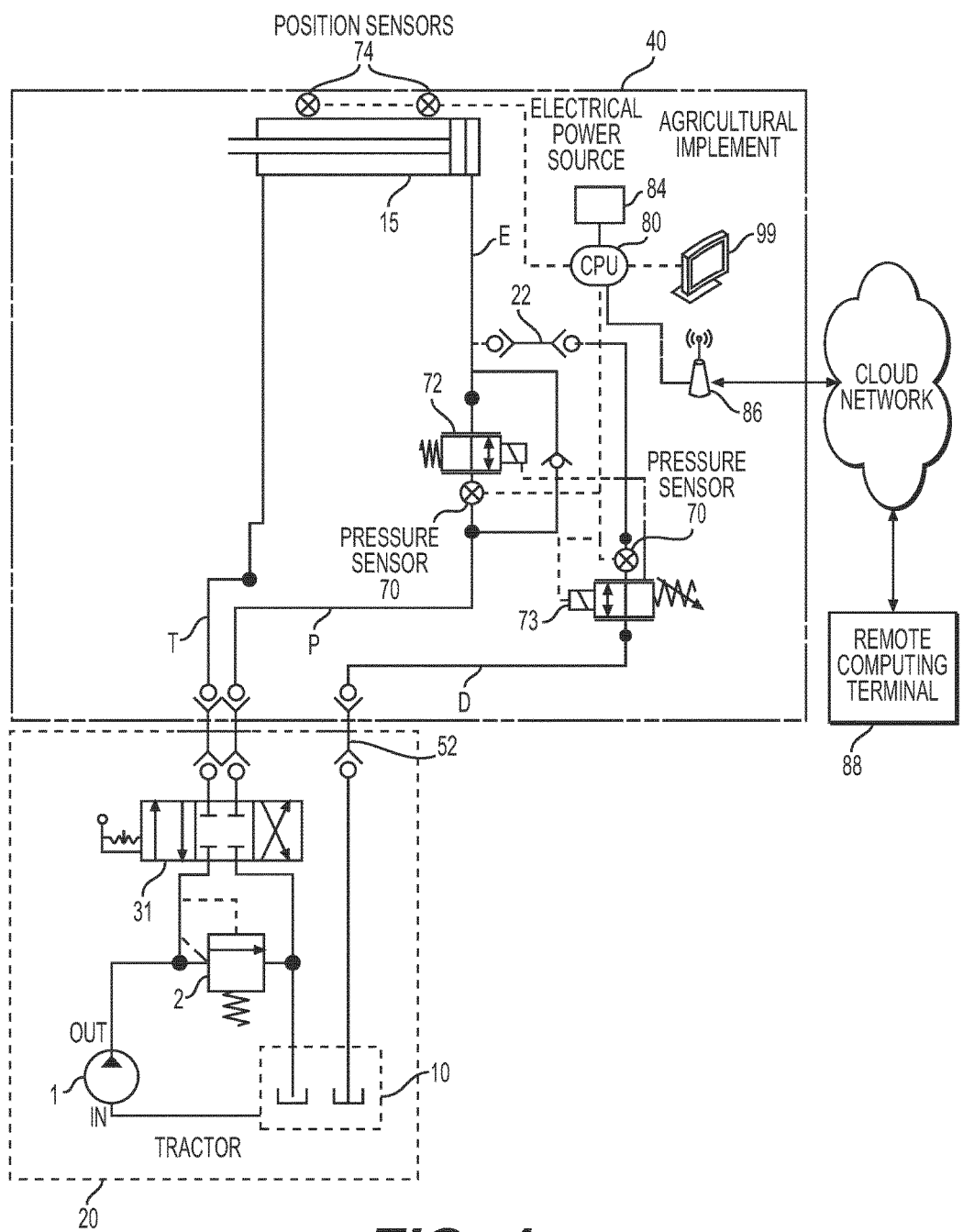
FIG. 4 is a schematic of an embodiment of a hydraulic circuit, with the portion on an agricultural implement equipped with electronic pressure sensors and solenoid valves in place of solely mechanical units, an electrical power source, and a hydraulic cylinder fitted with position sensors. Furthermore, the hydraulic circuit is equipped with a Central Processing Unit (CPU) for electronically monitoring and controlling the operation of a hydraulic pressure relief system, according to certain aspects of the disclosure.

FIG. 4 describes an embodiment similar to that of FIG. 3 with the addition of a Central Processing Unit (CPU) and memory unit 80, position sensors 74 mounted along the length of the hydraulic cylinder 15, display 99, an electrical power source 84, and electronic pressure sensors and solenoid valves 72 and 73 in place of the pressure control valve 12 (FIG. 3) and the pressure relief valve 14 (FIG. 3) to provide additional capabilities with respect to hydraulic system pressure monitoring. The electrical power source, for example a battery, provides the electrical power for all of the electrically operated devices and components comprising this embodiment.

The solenoid valves 72 and 73, and electronic pressure sensors 70 enable a multitude of pressure monitoring thresholds and responses. An example of this is the ability to detect a range of pressures, and also to provide a variety of responses based on changing pressure readings, or readings of other types of sensors, from which system pressure could be derived or otherwise indicated.

In addition, other types of sensors besides pressure sensors 70 can be used. For example, position sensors 74 on the hydraulic cylinder 15 which detect displacement, velocity or acceleration rates can serve as indicators of pressures or pressure changes within the hydraulic circuit. A rapid, unexpected change in position of the hydraulic cylinder 15 could indicate a change in pressure of a given hydraulic cylinder 15 due to some type of system failure.

Solenoid valves 72 and 73, and position sensors 74, can also trigger a plurality of system outputs over a range of pressures or other limits. For example, a "green light" status can be shown on a display 99 for when pressures are in a normal operating range, followed by a "yellow light" warning being shown on the display 99 when pressures rise to some threshold or thresholds but are still below the point at which the pressure relieving solenoid valve's 73 limit, or some other limit, is reached. When the electronic pressure sensors 70 detect a hydraulic pressure limit has been reached, the pressure relieving solenoid valve 73 opens to relieve hydraulic pressure and a "red light" is shown on the display 99.

Furthermore, the operator can be alerted by means of status messages on the display 99 or the tractor can be programmed to remain immobile if the SCV 31 is in the closed position as the tractor 20 and agricultural implement 40 begin to move, and while the agricultural wing 100 is in a low position.

Consequently, equipment operators and other parties, whether on or near the tractor 20 and agricultural implement 40 or in a remote location, can monitor the hydraulic pressures within the system, receive warning of escalating pressures and unusual operating conditions, as well as possess the ability to log the data for analysis in real-time or at a later point in time if the agricultural implement 40 is equipped with a wireless communication unit 86 and the remote computing terminal 88 is capable of accessing the agricultural implement 40 data, for example via a cloud network 90.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

The invention claimed is:
1. A system comprising:
   a hydraulic circuit for an agricultural implement, comprising:
      a hydraulic cylinder;
      a first hydraulic line connecting a hydraulic power source to the hydraulic cylinder;

a selective control valve for controlling the hydraulic cylinder, the selective control valve being provided between the hydraulic power source and the hydraulic cylinder;

a first pressure sensor which measures a first pressure in the first hydraulic line;

a first solenoid valve provided in the first hydraulic line, the first solenoid valve being controlled based on the first pressure;

a hydraulic line positioned between the first solenoid valve and the hydraulic cylinder;

a second pressure sensor which measures a second pressure in the hydraulic line; and a second solenoid valve provided in the hydraulic line, the second solenoid valve being controlled based on the second pressure, a central processing unit (CPU);

a data storage system;

a data transmission system; and a position sensor for monitoring a position of the hydraulic cylinder, wherein the selective control valve is movable between a first open position in which the hydraulic cylinder is configured to extend, a second open position in which the hydraulic cylinder is configured to retract, and a closed position in which the hydraulic cylinder is fixed, wherein, when a pressure of hydraulic fluid in the portion of the first hydraulic line between the first solenoid valve and the hydraulic cylinder is greater than the second predetermined maximum pressure setting, the second solenoid valve opens such that hydraulic fluid flows from the first hydraulic line through a second hydraulic line to a reservoir, wherein the CPU is coupled with the first and second pressure sensors and is configured to monitor and record input signals to a data storage system, and the data can then be transmitted from said data storage system to external locations by way of the data transmission system, and wherein the position sensor is coupled with the CPU, the CPU signals the second solenoid valve to open when the CPU calculates a rate of change in the position of the hydraulic cylinder correlates to an increase in hydraulic fluid pressure that would exceed a maximum allowable pressure, and the CPU signals the second solenoid valve to close when the rate of change in the position of the hydraulic cylinder correlates to a decrease in hydraulic fluid pressure that would fall below a maximum allowable pressure.

* * * * *